United States Patent
Endo et al.

(10) Patent No.: US 7,626,382 B2
(45) Date of Patent: Dec. 1, 2009

(54) ROTATION SPEED DETECTING APPARATUS AND AUTOMATIC TRANSMISSION CONTROLLER HAVING THE APPARATUS

(75) Inventors: Hiroatsu Endo, Nagoya (JP); Kentaro Kakuse, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 427 days.

(21) Appl. No.: 11/791,123

(22) PCT Filed: May 26, 2006

(86) PCT No.: PCT/JP2006/311136

§ 371 (c)(1),
(2), (4) Date: May 21, 2007

(87) PCT Pub. No.: WO2006/129811

PCT Pub. Date: Dec. 7, 2006

(65) Prior Publication Data

US 2008/0012551 A1 Jan. 17, 2008

(30) Foreign Application Priority Data

Jun. 3, 2005 (JP) .............................. 2005-164830

(51) Int. Cl.
*G01B 7/30* (2006.01)
*G01P 3/42* (2006.01)

(52) U.S. Cl. .................. 324/207.25; 324/166; 324/173; 324/160; 324/226; 324/179

(58) Field of Classification Search ................. 324/166, 324/173, 207.25, 160, 226, 179
See application file for complete search history.

(56) References Cited

U.S. PATENT DOCUMENTS

| 3,922,910 | A | 12/1975 | Dickinson et al. |
| 4,258,324 | A * | 3/1981 | Henrich ...................... 324/392 |
| 6,411,080 | B1 | 6/2002 | Bach et al. |
| 6,844,723 | B2 * | 1/2005 | Shirai et al. ............ 324/207.25 |

FOREIGN PATENT DOCUMENTS

| JP | 63-220788 A | 9/1988 |
| JP | 07-306218 | 11/1995 |
| JP | 2002-112580 A | 4/2002 |
| JP | 2004-077136 A | 3/2004 |

* cited by examiner

*Primary Examiner*—Reena Aurora
(74) *Attorney, Agent, or Firm*—Kenyon & Kenyon LLP

(57) ABSTRACT

An input shaft rotating speed detector detects an input shaft rotating speed Nin of an automatic transmission based on output signals from a resolver within a predetermined time period δt1. An output shaft rotating speed detector calculates the number of pulse signals output from an electromagnetic pickup sensor within the predetermined time period δt1, to detect an output shaft rotating speed Nout of the automatic transmission based on the time length of pulse intervals in the calculated number of pulse signals. With this configuration, the number of pulse signals used for calculating the output shaft rotating speed Nout can be changed, to thereby make a detection period of the output signals from the resolver used for calculating the input shaft rotating speed Nin be consistent with that of the pulse signals used for calculating the output shaft rotating speed Nout.

22 Claims, 9 Drawing Sheets

ROTATION SPEED DETECTING APPARATUS AND AUTOMATIC TRANSMISSION CONTROLLER HAVING THE APPARATUS

This is a 371 national phase application of PCT/JP2006/311136 filed 26 May 2006, which claims priority of Japanese Patent Application No. 2005-164830 filed 3 Jun. 2005, the contents of which are incorporated herein by reference.

TECHNICAL FIELD

The present invention relates to a rotation speed detecting apparatus for detecting rotation speeds of a first rotating member and a second rotating member, and also relates to an automatic transmission controller having the rotation speed detecting apparatus.

BACKGROUND ART

As a sensor for detecting a rotation speed and a rotation angle of a rotating member, various types of detecting apparatuses have been used. Japanese Patent Laid-Open Publication No. Hei 7-306218, for example, discloses that a rotation speed of a wheel is detected using a wheel speed sensor of an electromagnetic pickup type. On the other hand, Japanese Patent Laid-Open Publication No. 2004-77136 discloses detection of a rotation angle of a motor using a resolver.

Further, a method of detecting a rotation speed of a motor is disclosed in Japanese Patent Laid-Open Publications No. 2002-112580 and No. Sho 63-220788.

When a rotation speed of a rotating member is detected using an output signal from a sensor, a signal which has been output in a past time period prior to a detection time is used, taking into account the possibility that noise may be mixed into the output signal from the sensor. Accordingly, the rotation speed detected using the output signal from the sensor has a response delay relative to an actual rotation speed at the detection time. Further, when rotation speeds of a plurality of rotating members are detected using output signals from a plurality of sensors having different characteristics, the detected rotation speeds of the rotating members differ in length of response delay times due to different characteristics of the sensors. On the other hand, when a rotation speed of each rotating member is detected using a time length of pulse intervals in a predetermined number of pulse signals output from, for example, an electromagnetic pickup sensor, the length of response delay time in the detected rotation speed of each rotating member will change in accordance with an actual rotation speed (the time length of pulse intervals).

As such, when rotation speeds of a plurality of rotating members are detected using output signals from separate sensors, the length of response delay time occurring in the detected rotation speeds might vary for each of the sensors. Such a difference in the length of response delay time results in a problem that accuracy of detecting the rotation speed varies for each rotating member. Further, when speed change control of an automatic transmission is performed, for example, it is necessary for rotation speeds of an input shaft and an output shaft to be separately detected using output signals from different sensors. In the detection, if the accuracy of detecting the rotation speed is inconsistent between the input shaft and the output shaft, accuracy of the speed change control is in turn lowered, thereby causing gear shift shock to occur during switching of a frictional engagement device to be engaged.

The present invention advantageously provides a rotation speed detecting apparatus capable of detecting rotation speeds of a plurality of rotating members using output signals from different sensors, while maintaining consistent accuracy in the detection of rotation speeds of the rotating members. Further, the present invention provides an automatic transmission controller in which accuracy of speed change control can be improved.

DISCLOSURE OF THE INVENTION

According to the present invention, a rotation speed detecting apparatus for detecting rotation speeds of a first rotating member and a second rotating member using a first sensor which outputs a pulse signal for each predetermined angle of rotation of the first rotating member and a second sensor which outputs a signal corresponding to an angle of rotation of the second rotating member, comprises a first rotation speed detector which detects the rotation speed of the first rotating member based on a time length of pulse intervals in a plurality of pulse signals output from the first sensor; and a second rotation speed detector which detects the rotation speed of the second rotating member based on the output signal from the second sensor. In the rotation speed detecting apparatus, a detection period of the pulse signals from the first sensor used for determining the rotation speed of the first rotating member is synchronized with a detection period of the output signals from the second sensor used for determining the rotation speed of the second rotating member, to detect the rotation speeds of the first rotating member and the second rotating member.

In an aspect of the present invention, the rotation speed detecting apparatus for detecting rotation speeds of a first rotating member and a second rotating member using a first sensor which outputs a pulse signal for each predetermined angle of rotation of the first rotating member and a second sensor which outputs a signal corresponding to an angle of rotation of the second rotating member-comprises a first rotation speed detector which detects the rotation speed of the first rotating member based on a time length of pulse intervals in a plurality of pulse signals output from the first sensor, and a second rotation speed detector which detects the rotation speed of the second rotating member based on a change of the output signal from the second sensor within a predetermined time period. In the rotation speed detecting apparatus, the first rotation speed detector calculates the number of pulse signals output from the first senor within the predetermined time period, to detect the rotation speed of the first rotating member based on the time length of pulse intervals in the calculated number of pulse signals.

In another aspect of the present invention, the rotation speed detecting apparatus for detecting rotation speeds of a first rotating member and a second rotating member using a first sensor which outputs a pulse signal for each first predetermined angle of rotation of the first rotating member and a second sensor which outputs a signal corresponding to an angle of rotation of the second rotating member comprises a first rotation speed detector which detects the rotation speed of the first rotating member based on the time length of pulse intervals in a plurality of pulse signals output from the first sensor, and a second rotation speed detector which detects a length of time required for a second predetermined angle of rotation of the second rotating member based on the output signal from the second sensor, to detect the rotation speed of the second rotating member. In the rotation speed detecting apparatus, the first rotation speed detector calculates the number of pulse signals output from the first sensor during the second predetermined angle of rotation of the second rotating member, to detect the rotation speed of the first rotating member based on the time length of pulse intervals in the calculated number of pulse signals.

In still another aspect of the present invention, the rotation speed detecting apparatus for detecting rotation speeds of a first rotating member and a second rotating member using a first sensor which outputs a pulse signal for each first predetermined angle of rotation of the first rotating member and a second sensor which outputs a signal corresponding to an angle of rotation of the second rotating member comprises a first rotation speed detector which detects the rotation speed of the first rotating member based on a time length of pulse intervals in a plurality of pulse signals output from the first sensor, and a second rotation speed detector capable of selectively performing constant-time detection for determining the rotation speed of the second rotating member based on a change of the output signal from the second sensor within a predetermined time period or constant-angle detection for determining a length of time required for the second predetermined angle of rotation of the second rotating member based on the output signal from the second sensor to detect the rotation speed of the second rotating member. In the rotation speed detecting apparatus, when the second rotation speed detector performs the constant-time detection to detect the rotation speed of the second rotating member, the first rotation speed detector calculates the number of pulse signals output from the first sensor during the predetermined time period, to detect the rotation speed of the first rotating member based on the time length of pulse interval in the calculated number of pulse signals. On the other hand, when the second rotation speed detector performs the constant-angle detection to detect the rotation speed of the second rotating member, the first rotation speed detector calculates the number of pulse signals output from the first sensor during the second predetermined angle of rotation of the second rotating member, to detect the rotation speed of the first rotating member based on the time length of pulse intervals in the calculated number of pulse signals.

In a further aspect of the present invention, the rotation speed detecting apparatus for detecting rotation speeds of a first rotating member and a second rotating member using a first sensor which outputs a pulse signal for each predetermined angle of rotation of the first rotating member and a second sensor which outputs a signal corresponding to an angle of rotation of the second rotating member comprises a first rotation speed detector which detects the rotation speed of the first rotating member based on a time length of pulse intervals in a predetermined number of pulse signals output from the first sensor, and a second rotation speed detector which calculates a length of time required for output of the predetermined number of pulse signals from the first sensor to detect the rotation speed of the second rotating member based on a change of the output signal from the second sensor within the calculated length of required time.

In yet another aspect of the present invention, the rotation speed detecting apparatus for detecting rotation speeds of a first rotating member and a second rotating member using a first sensor which outputs a pulse signal for each predetermined angle of rotation of the first rotating member and a second sensor which outputs a signal corresponding to an angle of rotation of the second rotating member comprises a first rotation speed detector which detects the rotation speed of the first rotating member based on a time length of pulse intervals in a predetermined number of pulse signals output from the first sensor, and a second rotation speed detector which calculates an angle of rotation of the second rotating member during output of the predetermined number of pulse signals from the first sensor and determines a length of time required for the calculated angle of rotation of the second rotating member based on the output signals from the second sensor to detect the rotation speed of the second rotating member.

In another aspect of the present invention, the rotation speed detecting apparatus for detecting rotation speeds of a first rotating member and a second rotating member using a first sensor which outputs a pulse signal for each first predetermined angle of rotation of the first rotating member and a second sensor which outputs a pulse signal for each second predetermined angle of rotation of the second rotating member comprises a first rotation speed detector which detects the rotation speed of the first rotating member based on a time length of pulse intervals in a predetermined number of pulse signals output from the first sensor, and a second rotation speed detector which detects the rotation speed of the second rotating member based on the time length of pulse intervals in a plurality of pulse signals output from the second sensor. In the rotation speed detecting apparatus, the second rotation speed detector calculates the number of pulse signals output from the second sensor during output of the predetermined number of pulse signals from the first sensor, to detect the rotation speed of the second rotating member based on the time length of pulse intervals in the calculated number of pulse signals.

In still another aspect, the present invention provides an automatic transmission controller for performing, on an automatic transmission capable of switching a frictional engagement device to be engaged among a plurality of frictional engagement devices to thereby change a gear shift ratio of an input shaft to an output shaft, speed change control of disengaging an engaged one of the frictional engagement devices while engaging a released one of the frictional engagement devices which has not been engaged. The automatic transmission controller comprises the rotation speed detecting apparatus according to the present invention, in which a rotation speed of one of the input and output shafts is determined as the rotation speed of the first rotating member, and a rotation speed of the other one of the input and output shafts is determined as the rotation speed of the second rotating member, and the speed change control is performed based on the rotation speeds of the input and output shafts determined by the rotation speed detecting apparatus.

According the present invention, the detection period of the pulse signals from the first sensor used for determining the rotation speed of the first rotating member can be matched with the detection period of the output signals from the second sensor, to detect the rotation speeds of the first and second rotating members using the matched detection periods. As a result, consistent accuracy can be maintained between detections of the rotation speeds of the rotating members. Further, because the speed change control of the automatic transmission is performed based on the rotation speeds of the input and output shafts having the consistent accuracy, accuracy in speed change control can be improved.

BEST MODE FOR CARRYING OUT THE INVENTION

Figure 1:
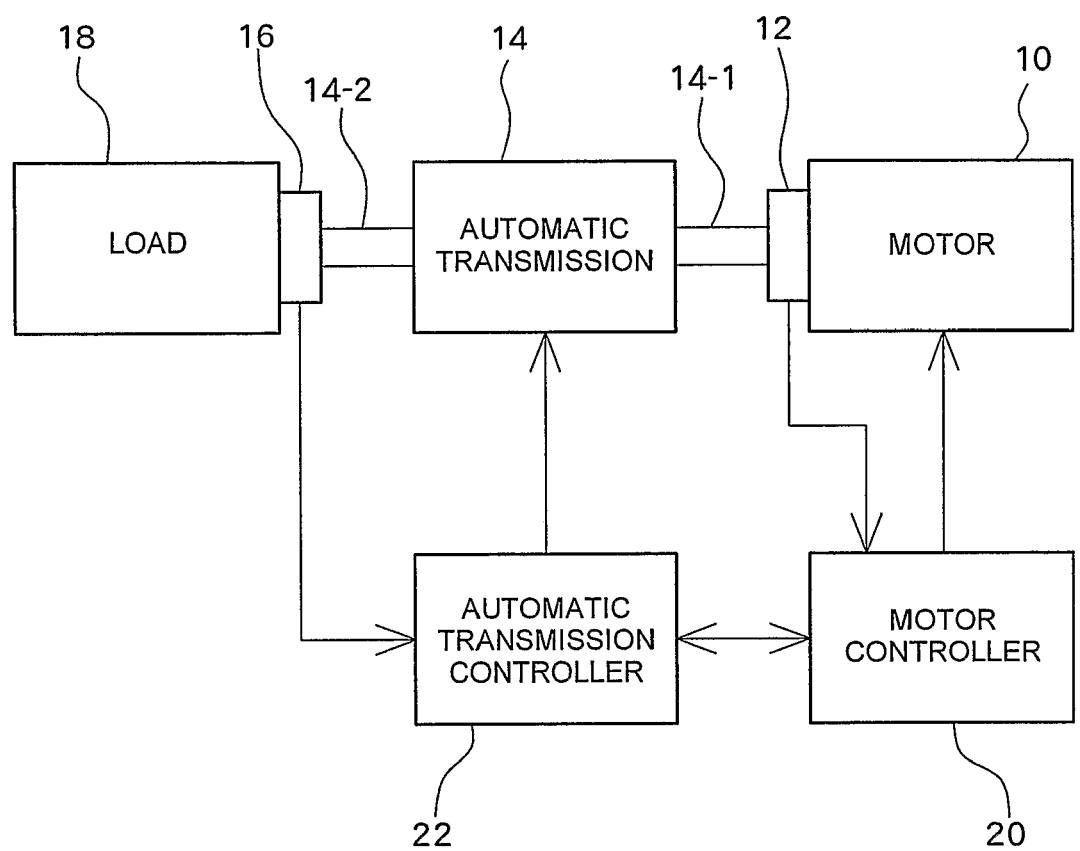
FIG. 1 shows a schematic configuration of a control system for an automatic transmission having a rotation speed detecting apparatus according to an embodiment of the present invention.

Referring to the drawings, a preferred embodiment of the present invention will be described below.

FIG. 1 shows a schematic configuration of an automatic transmission controlling system having a rotation speed detecting apparatus according to an embodiment of the present invention. The automatic transmission controlling system according the present embodiment comprises a motor 10, a resolver 12, an automatic transmission 14, an electromagnetic pickup sensor 16, a motor controller 20, and an automatic transmission controller 22, which will be described in detail below.

A rotor of the motor 10 is connected to an input shaft 14-1 of the automatic transmission 14. The automatic transmission 14 performs a speed change of drive power transferred from the motor 10 to the input shaft 14-1 and transfers the speed changed drive power to an output shaft 14-2. The drive power transferred to the output shaft 14-2 of the automatic transmission 14 is further transferred to a load 18, and used for driving the load, such as a vehicle.

The automatic transmission 14 comprises a planetary gear mechanism disposed between the input shaft 14-1 and the output shaft 14-2, and a plurality of frictional engagement devices for regulating degrees of freedom in rotation of the planetary gear mechanism. As the above-described components have been well known, and specific configurations of the components are not illustrated in FIG. 1. Here, the frictional engagement device may be realized by a clutch or a brake. Engagement/disengagement of each frictional engagement device may be switched, for example, using an oil pressure, and an engaging force of each frictional engagement device can be adjusted by regulating an oil pressure supplied to each frictional engagement derive. In the automatic transmission 14, a transmission gear ratio between input and output shafts (a ratio of a rotation speed Nin of the input shaft 14-1 to a rotation speed Nout of the output shaft 14-2) can be changed by switching a frictional engagement device to be engaged among a plurality of the frictional engagement devices.

To detect a rotation speed Nin of the rotor of the motor 10 (the rotation speed Nin of the input shaft 14-1), the resolver 12 is attached to the motor 10. The resolver 12 including an exciting coil and coils in sine and cosine phases outputs signals (sine-phase and cosine-phase signals) corresponding to a rotation angle $\alpha$ of the rotor of the motor 10 to the motor controller 20. As the resolver 12 has a well-known configuration, the configuration of the resolver 12 is not specifically illustrated in FIG. 1.

Further, to detect a rotation speed Nout of the load 18 (the rotation speed Nout of the output shaft 14-2 of the automatic transmission 14), the electromagnetic pickup sensor 16 is provided to the output shaft 14-2 of the automatic transmission 14. More specifically, the electromagnetic pickup sensor 16 positioned near an outer periphery of a tooth-shape rotor rotating integrally with the output shaft 14-2 and having saw teeth formed at predetermined angular intervals on the outer periphery. Because a magnetic flux changes when one of the saw teeth on the tooth-shaped rotor passes through close proximity of the electromagnetic pickup sensor 16 as the tooth-shape rotor rotates, the electromagnetic pickup sensor 16 senses the change in magnetic flux and converts the change in magnetic flux into a voltage signal which is then output from the electromagnetic pickup sensor 16. With this configuration, the electromagnetic pickup sensor 16 outputs a pulse signal to the automatic transmission controller 22 every time the load 18 (the output shaft 14-2 of the automatic transmission 14) rotates by a predetermined angle $\delta\theta1$. As the electromagnetic pickup sensor 16 has a well-known configuration, the configuration of the electromagnetic pickup sensor 16 is not specifically illustrated in FIG. 1.

The motor controller 20, which is configured as a microprocessor mainly including a CPU, comprises a ROM storing a processing program, a RAM for temporarily storing data, input and output ports, and a communication port. An output signal from the resolver 12 and the like are input via the input port into the motor controller 20. On the other hand, a motor control signal for controlling operation conditions of the motor 10 and the like are output via the output port from the motor controller 20. Further, a signal representing the rotation speed Nin of the motor 10 detected based on the output signal from the resolver 12 and the like are output via the communication port from the motor controller 20 to the automatic transmission controller 22.

The automatic transmission controller 22, which is configured as a microprocessor mainly including a CPU, comprises a ROM storing a processing program, a RAM for temporarily storing data, input and output ports, and a communication port. The automatic transmission-controller 22 is supplied with pulse signals from the electromagnetic pickup sensor 16 and the like which are input via the input port, and also supplied with a signal representing the rotation speed Nin of the motor 10 from the motor controller 20 and the like which are input via the communication port. The automatic transmission controller 22, on the other hand, outputs from the output port a speed change control signal for controlling a transmission gear ratio of the automatic transmission 14 and the like.

Figure 2:
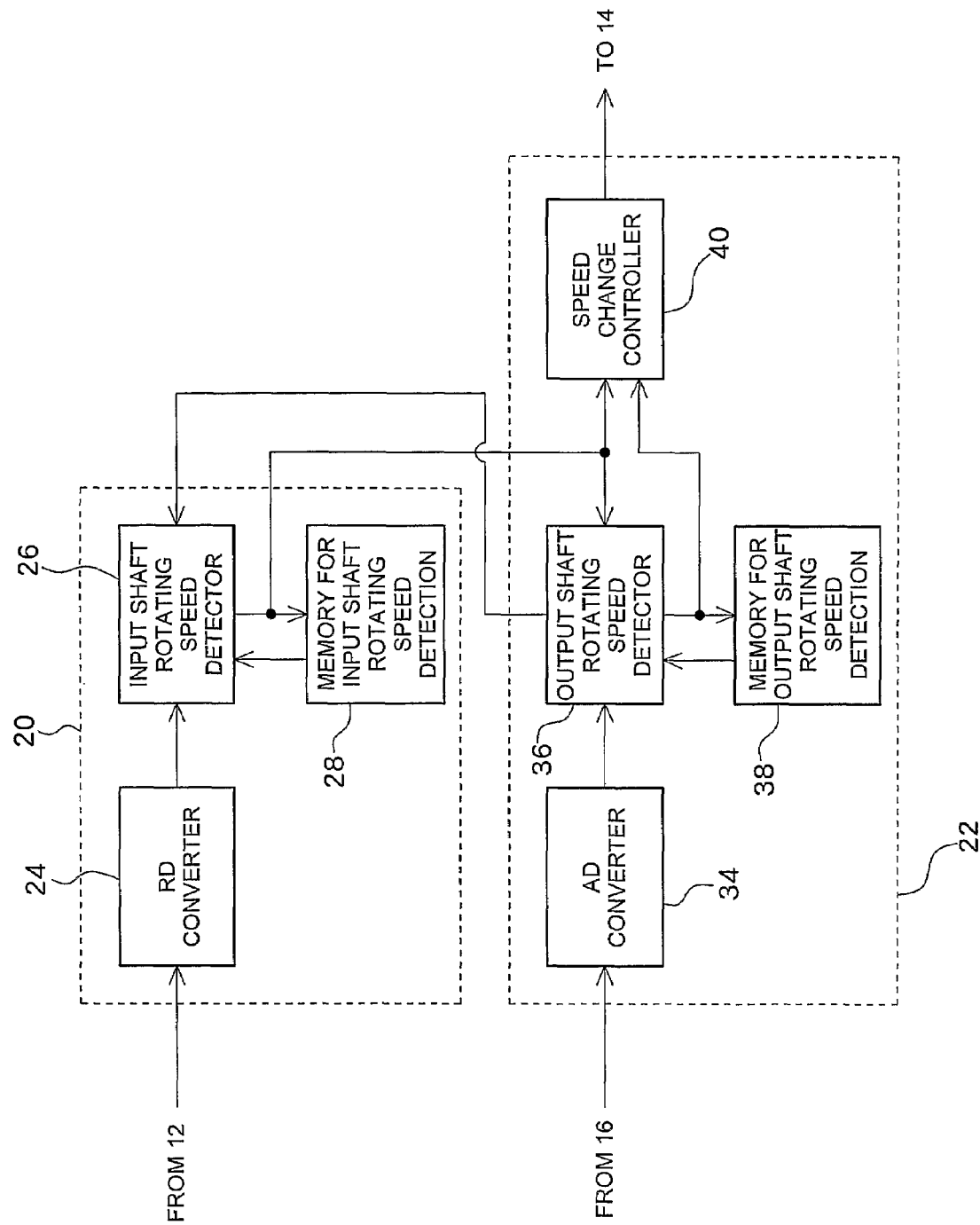
FIG. 2 is a block diagram showing a schematic configuration of the rotation speed detecting apparatus according to the embodiment of the present invention.

In the present embodiment, the motor controller 20 detects the rotation speed Nin of the input shaft 14-1 of the automatic transmission 14 based on the output signals (sine-phase and cosine-phase signals) from the resolver 12, while the automatic transmission controller 22 detects the rotation speed Nout of the output shaft 14-2 of the automatic transmission 14 based on pulse signals from the electromagnetic pickup sensor 16. Referring to a block diagram of FIG. 2, a configuration for determining the rotation speed Nin of the input shaft 14-1 and the rotation speed Nout of the output shaft 14-2 will be described below.

In the motor controller 20, an RD converter 24 converts analogue signals (sine-phase and cosine-phase signals) from the resolver 12 into a digital signal representing a rotation angle $\alpha$ of the rotor of the motor 10 and outputs the converted digital signal. Further, the RD converter 24 generates a pulse signal from the output signals of the resolver 12 and outputs the generated pulse signal every time the rotor of the motor 10 rotates by a predetermined angle $\delta\alpha 1$ (for example, 180°).

Figure 3:
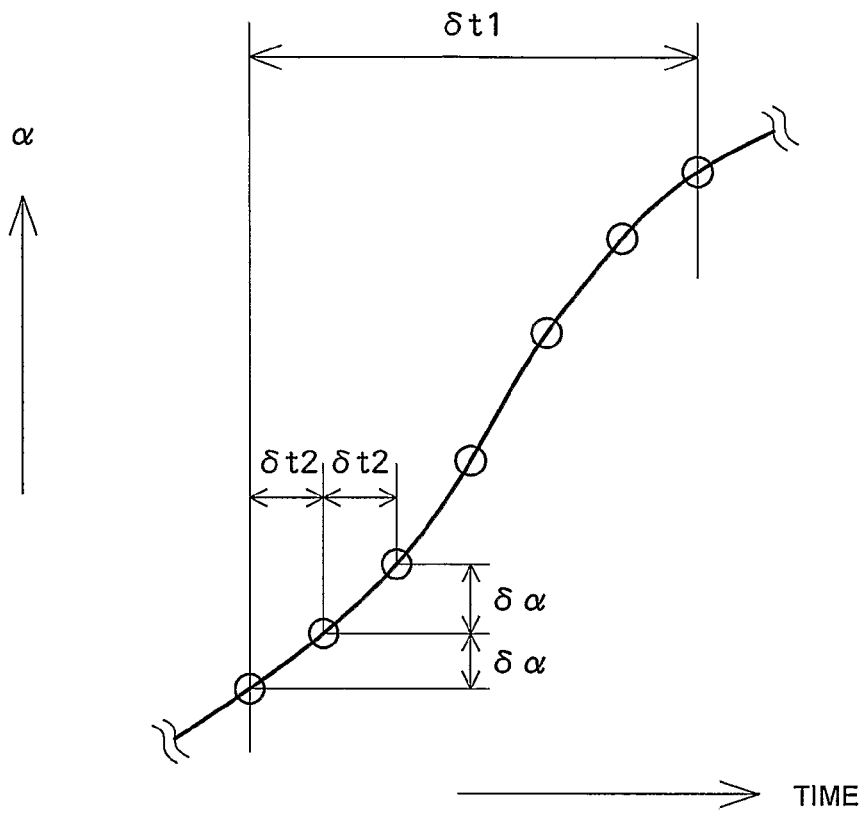
FIG. 3 is a diagram explaining a processing example for detecting a rotation speed of an input shaft of an automatic transmission.

An input shaft rotating speed detector 26 is able to perform constant-time detection for determining the rotation speed Nin of the input shaft 14-1 based on a change of the output signal representing the rotation angle $\alpha$ within a predetermined time period $\delta t1$ obtained from the RD converter 24 (the output signal from the resolver 12). To detect the rotation speed Nin of the input shaft 14-1 in the constant-time detection, the input shaft rotating speed detector 26 calculates, as shown in FIG. 3, $\delta\alpha/\delta t2$, the rate of change of the rotation angle $\alpha$ with respect to time in each sampling period $\delta t2$ ($\delta t2 < \delta t1$) from the output signal of the RD converter 24 and temporarily stores the calculated results in a memory 28 for input shaft rotating speed detection, which are repeated a plurality of times until the predetermined time period $\delta t1$ has elapsed. Then, the rotation speed Nin of the input shaft 14-1 is computed using a plurality of the rates of time-varying changes $\delta\alpha/\delta t2$'s stored in the memory 28 for input shaft rotating speed detection (for example, by calculating an average value of the rates of time-varying changes $\delta\alpha/\delta t2$'s). The obtained rotation speed Nin of the input shaft 14-1 is stored in the memory 28 for input shaft rotating speed detection, and output to the automatic transmission controller 22.

Figure 4:
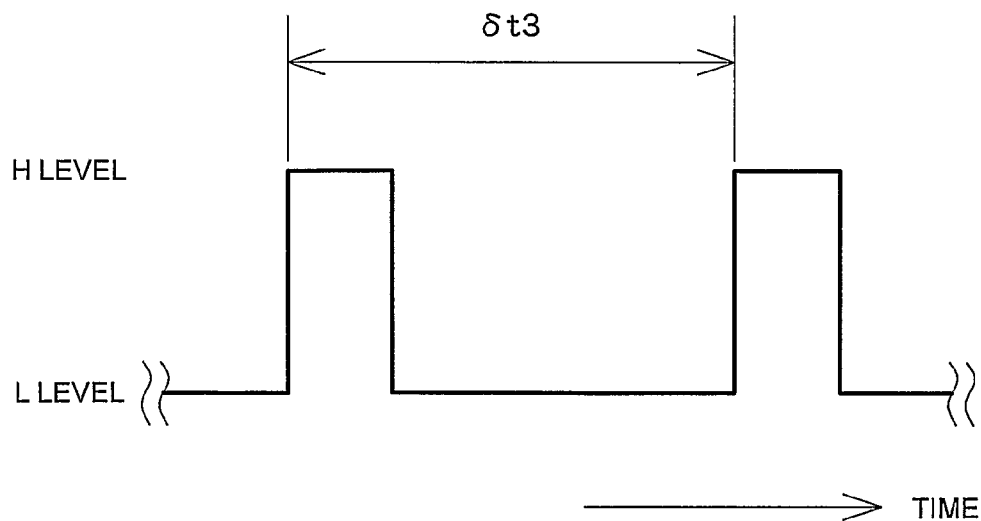
FIG. 4 is a diagram explaining another processing example for detecting the rotation speed of the input shaft of the automatic transmission.

Further, the input shaft rotating speed detector 26 is also able to perform constant-angle detection in which a length of time required for the rotor of the motor 10 (the input shaft 14-1) to rotate by the predetermined angle $\delta\alpha 1$ is determined based on the pulse signal from the RD converter 24 (the output signal from the resolver 12), to thereby detect the rotation speed Nin of input shaft 14-1. To detect the rotation speed Nin of the input shaft 14-1 in the constant-angle detection, the input-shaft rotating speed detector 26 detects, as shown in FIG. 4, a time length of pulse interval $\delta t3$ in the pulse signals output from the RD converter 24 every time the rotor of the motor 10 rotates by the predetermined angle $\delta\alpha 1$, to detect the rotation speed Nin of the input shaft 14-1. The detected time length of pulse interval $\delta t3$ is stored in the memory 28 for input shaft rotating speed detection, while the determined rotation speed Nin of the input shaft 14-1 is output to the automatic transmission controller 22. In the detection of the time length of pulse interval $\delta t3$, a length of either a time interval between rising edges of pulses or a time interval between falling edges of pulses may be used.

Figure 5:
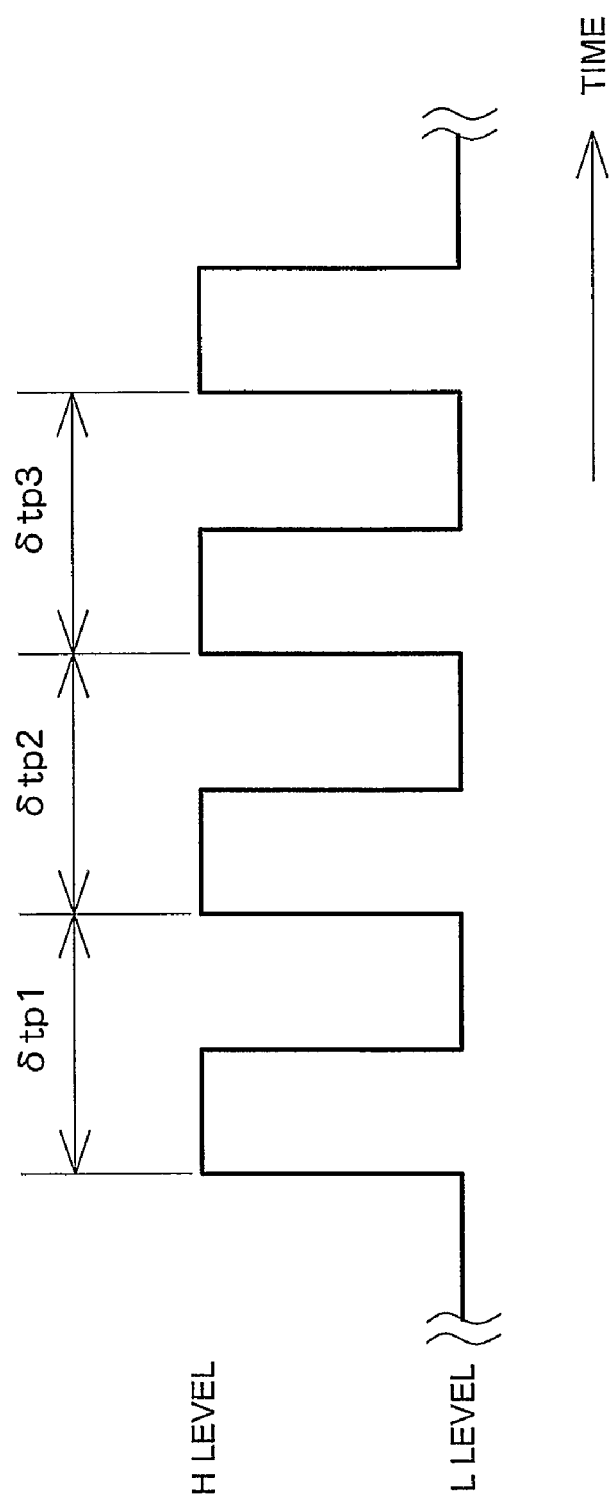
FIG. 5 is a diagram explaining a processing example for detecting a rotation speed of an output shaft of the automatic transmission.

In the automatic transmission controller 22, an AD converter 34 converts an analogue signal (a pulse signal) from the electromagnetic pickup sensor 16 into a digital signal which is then output from the AD converter 34. An output shaft rotating speed detector 36 detects the rotation speed Nout of the output shaft 14-2 based on the time length of pulse intervals in a plurality of pulse signals output from the AD converter 34 (the electromagnetic pickup sensor 16). To detect the rotation speed Nout of the output shaft 14-2 based on, for example, the time lengths of pulse intervals $\delta tp1$, $\delta tp2$, and $\delta tp3$ in four pulse signals as shown in FIG. 5, each time length of pulse interval $\delta tp1$, $\delta tp2$ and $\delta tp3$ is detected and temporarily stored in a memory 38 for output shaft rotating speed detection successively. Then, the rotation speed Nout of the output shaft 14-2 is computed using the time lengths of pulse intervals $\delta tp1$, $\delta tp2$, and $\delta tp3$ stored in the memory 38 for output shaft rotating speed detection (by calculating an average value of the time lengths of pulse intervals $\delta tp1$, $\delta tp2$, and $\delta tp3$, for example). The determined rotation speed Nout of the output shaft 14-2 is stored in the memory 38 for output shaft rotating speed detection. It should be noted that the number of pulses used for determining the rotation speed Nout of the output shaft 14-2 is variable as described later. Further, in the detection of the time lengths of pulse interval $\delta tp1$, $\delta tp2$, and $\delta tp3$, the length of either a time interval between rising edges of pulses or a time interval between falling edges of pulses may be detected.

A speed change controller 40 performs a clutch-to-clutch speed change control in which the transmission gear ratio of the automatic transmission 14 is changed by disengaging an engaged frictional engagement device while engaging a released frictional engagement device which has not been engaged. During the clutch-to-clutch speed change control, the speed change controller 40 controls engaging forces of the frictional engagement devices to be disengaged and to be engaged based on the rotation speed Nin of the input shaft 14-1 determined by the input shaft rotating speed detector 26 and the rotation speed Nout of the output shaft 14-2 determined by the output shaft rotating speed detector 36.

Figure 6:
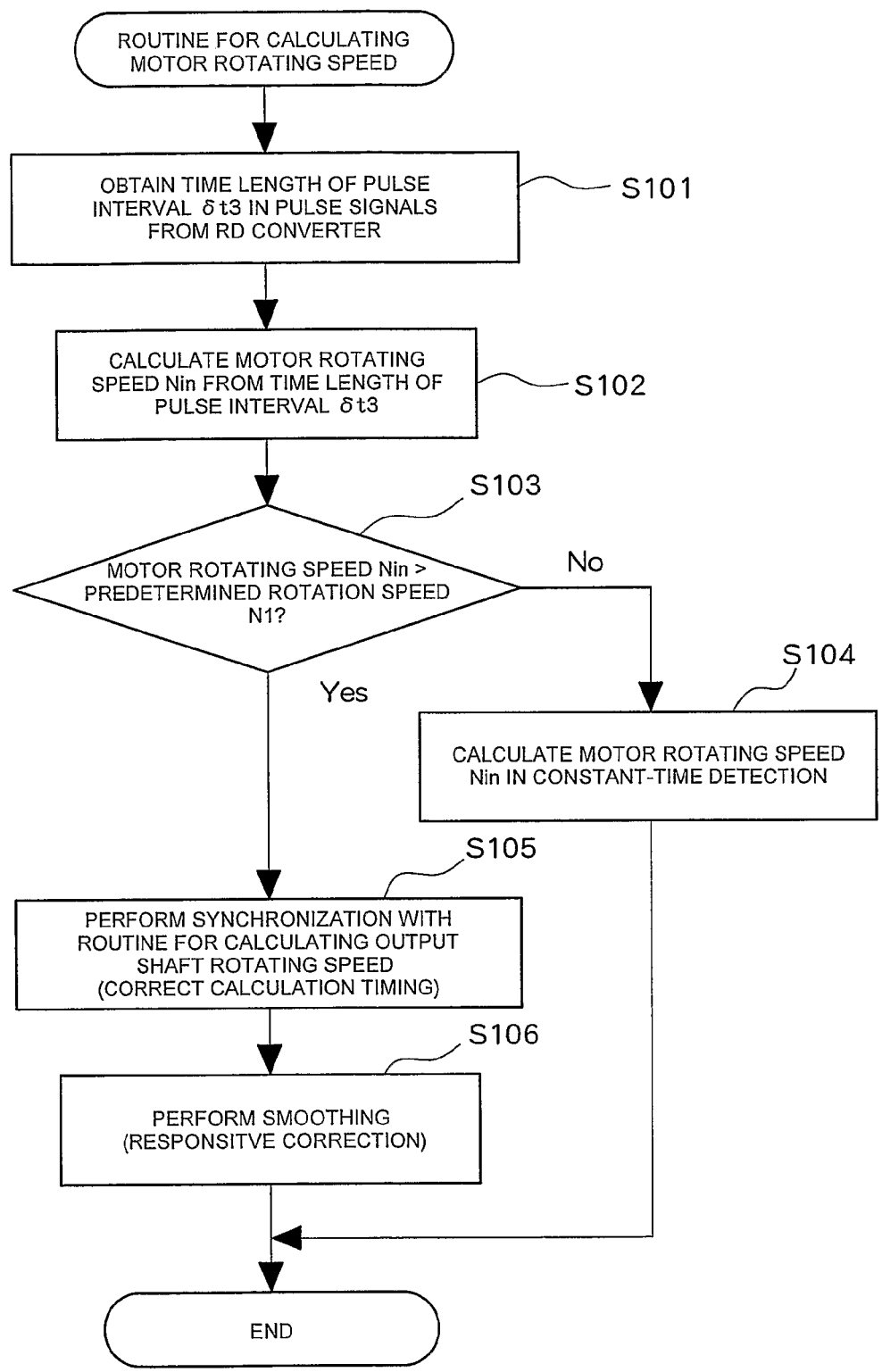
FIG. 6 is a flowchart showing an example of a routine for calculating a motor rotating speed executed by a motor controller.

Next will be described process steps of determining the rotation speed Nin of the rotor of the motor 10 (the rotation speed Nin of the input shaft 14-1 of the automatic transmission 14) at a time tn in the present embodiment. FIG. 6 is a flowchart showing an example of a routine for calculating a motor rotating speed executed by the motor controller 20. This routine is repeated at intervals of predetermined control cycles.

Once the routine for calculating a motor rotating speed is started, the input shaft rotating speed detector 26 reads out and obtains, from the memory 28 for input shaft rotating speed detection, the time length of pulse interval $\delta t3$ in the pulse signal from the RD converter 24 in step S101. Here, the time length of pulse interval $\delta t3$ detected at a time closest to the time tn is obtained. Next, in step S102, the input shaft rotating speed detector 26 calculates the rotation speed Nin of the motor 10 (the rotation speed Nin of the input shaft 14-1) from the time length of pulse interval $\delta t3$ obtained in step S101. In other words, the rotation speed Nin of the motor 10 is calculated by the constant-angle detection.

In subsequent step S103, the input shaft rotating speed detector 26 judges whether or not the rotation speed Nin of the motor 10 calculated through the constant-angle detection in step S102 is greater than a predetermined rotation speed N1. Here, the predetermined rotation speed N1 is specified as a threshold value at which accuracy of computing the rotation speed Nin of the motor 10 in the constant-angle detection can be ensured. When the rotation speed Nin of the motor 10 is smaller than or equal to the predetermined rotation speed N1 (when NO is judged in step S103), it is determined that the accuracy of computing the rotation speed Nin of the motor 10 using the constant-angle detection will be lowered, and operation moves to step S104. On the other hand, when the rotation speed Nin of the motor 10 is greater than the predetermined rotation speed N1 (when YES is judged in step S103), the accuracy of computing the rotation speed Nin of the motor 10 using the constant-angle detection is determined to be securable, and operation moves to step S105.

In step S104, the input shaft rotating speed detector 26 calculates the rotation speed Nin of the motor 10 in the constant-time detection. More specifically, the input shaft rotating speed detector 26 reads out and obtains, from the memory 28 for input shaft rotating speed detection, the rate of time-varying changes δα/δt2's of the rotation angle α of the motor 10 detected within a predetermined time period δt1 earlier than the time tn, and calculates the rotation speed Nin of the motor 10 from the obtained rate of time-varying changes δα/δt2 of the rotation angle α. Then, operation of the present routine is finished. As described above, the input shaft rotating speed detector 26 selects, according to the calculated result of the rotation speed Nin of the motor 10 obtained in the constant-angle detection, which of the constant-time detection and the constant-angle detection is used for determining the rotation speed Nin of the motor 10.

Further, in step S105, the input shaft rotating speed detector 26 performs synchronization with a routine for calculating an output shaft rotating speed, which will be described later. For example, when a time lag between calculation timings of the rotation speed Nin of the motor 10 and the rotation speed Nout of the output shaft 14-2 occurs due to delay of communication between the motor controller 20 and the automatic transmission controller 22 or the like, the calculation timings are synchronized with respect to a delayed one of the calculation timings. Next, in step S106, the input shaft rotating speed detector 26 performs low-pass filtering (smoothing) of the calculated rotation speed Nin of the motor 10. Noise components contained in the calculated rotation speed Nin of the motor 10 are suppressed through the low-pass filtering (smoothing). Then, operation of this routine is finished.

Figure 7:
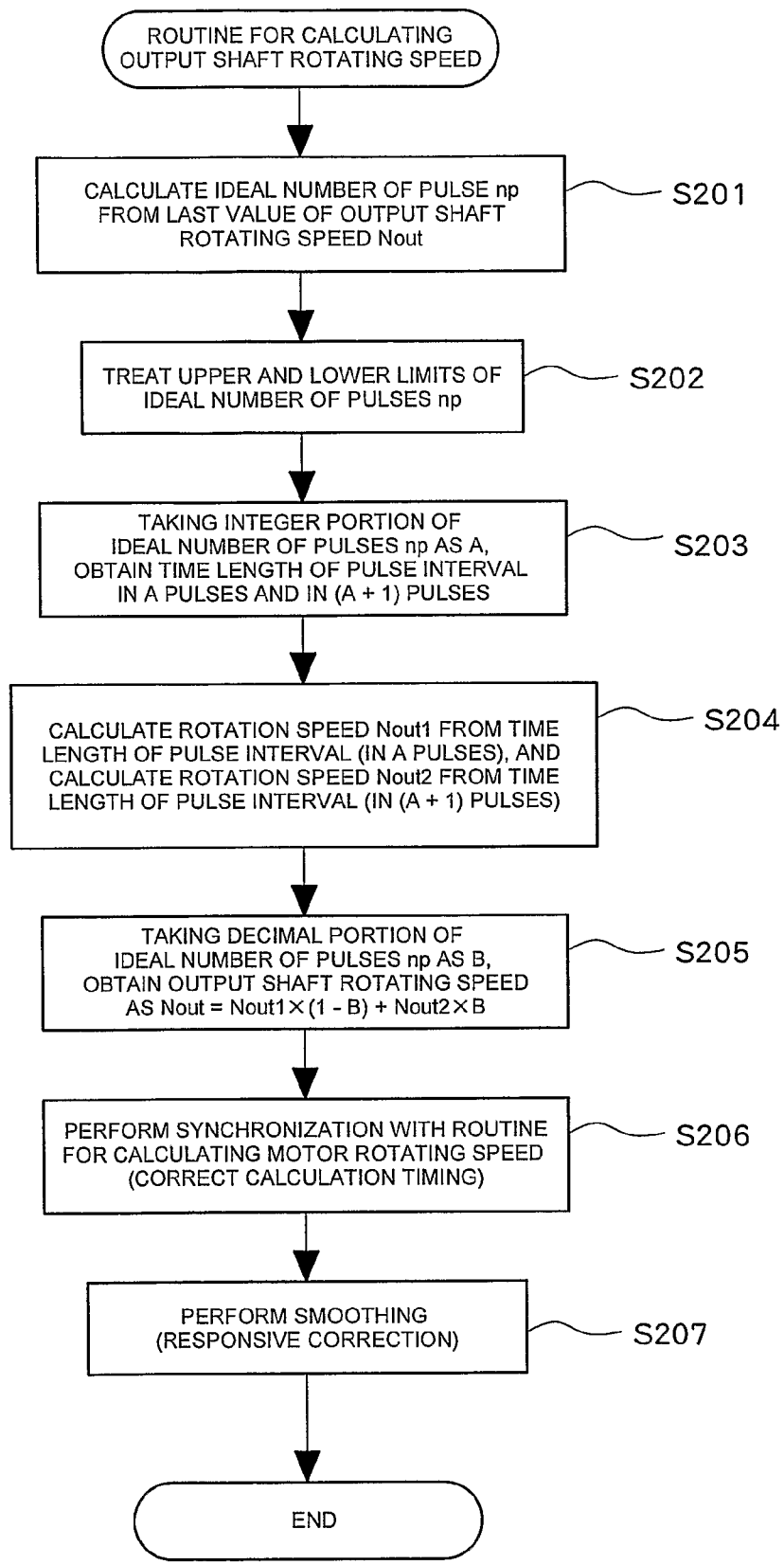
FIG. 7 is a flowchart showing an example of a routine for calculating an output shaft rotating speed executed by an automatic transmission controller.
Figure 8:
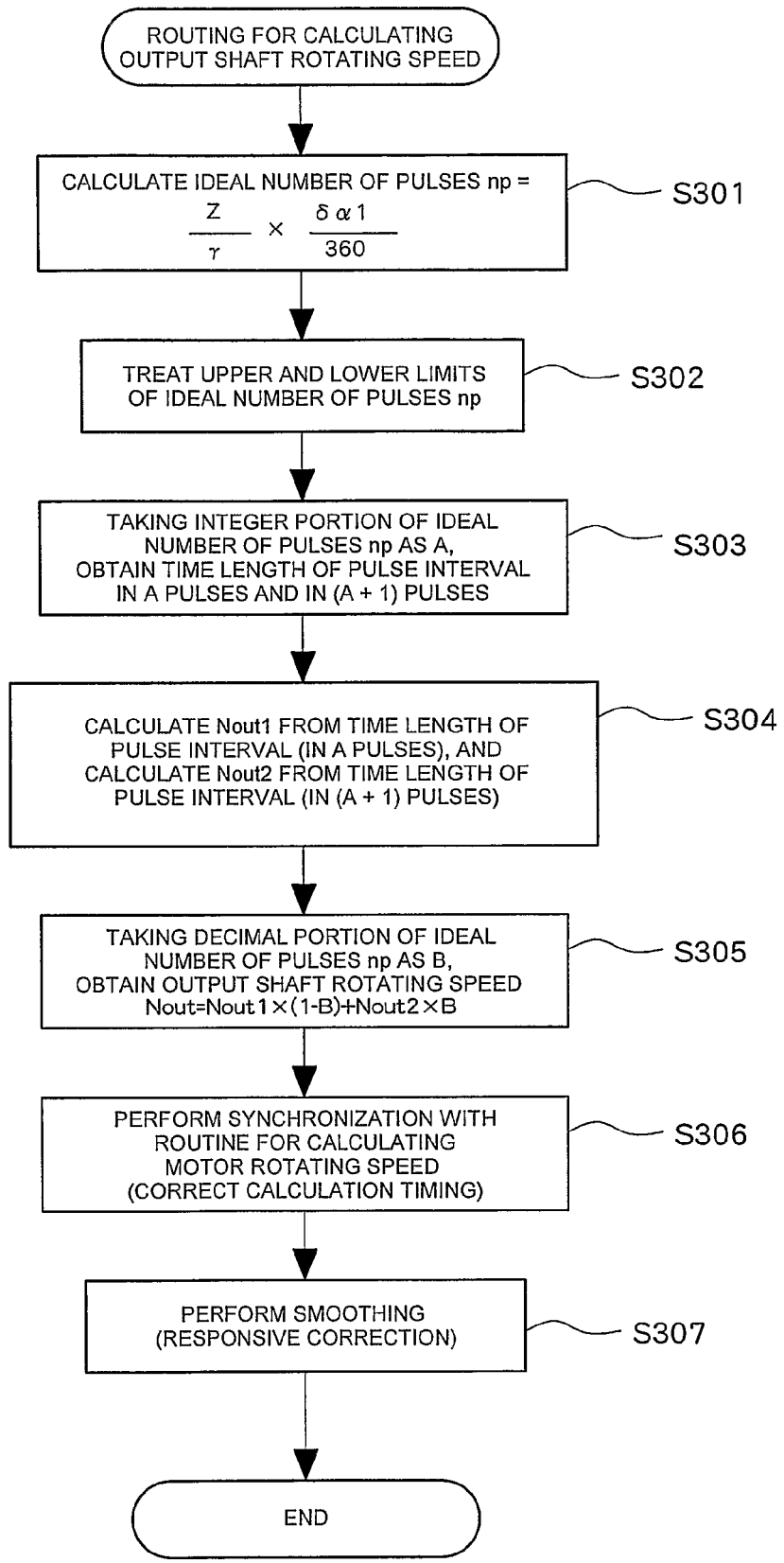
FIG. 8 is a flowchart showing another example of a routine for calculating an output shaft rotating speed executed by the automatic transmission controller.

Next will be described process steps of determining the rotation speed Nout of the output shaft 14-2 of the automatic transmission 14 at the time tn. FIGS. 7 and 8 are flowcharts showing examples of a routine for calculating an output shaft rotating speed performed by the automatic transmission controller 22. The routine shown in FIG. 7 is executed when NO is judged in step S103, i.e. when the rotation speed Nin of the motor 10 is determined in the constant-time detection. The routine shown in FIG. 8, on the other hand, is executed when YES is judged in step S103, i.e. when the rotation speed Nin of the motor 10 is determined in the constant-angle detection.

Once the routine for calculating an output shaft rotating speed shown in FIG. 7 starts, the output shaft rotating speed detector 36 calculates the number of pulse signals (an ideal number of pulses) np output from the AD converter 34 (the electromagnetic pickup sensor 16) within the predetermined time period δt1 which precedes the time tn. Here, the ideal number of pulses (i.e. an average number of pulses) np may be estimated from the rotation speed Nout of the output shaft 14-2 which has been detected at a past point in time prior to the time tn, for example, estimated from the rotation speed Nout of the motor 10 detected in the previous detection (last detection). Alternatively, the ideal number of pulses np may be estimated from the rotation speed Nin of the motor 10 detected at a past point in time prior to the time tn, for example, that detected in the previous detection (last detection). Next, in step S202, the output shaft rotating speed detector 36 processes upper and lower limits of the ideal number of pulses np calculated in step S201. In this processing, the lower limit is restricted such that the ideal number of pulses np becomes 2 or greater, while the upper limit is restricted such that each time length of the pulse interval can be stored in the memory 38 for output shaft rotating speed detection.

Then, in step S203, the output shaft rotating speed detector 36 reads out and obtains the time lengths of pulse intervals in the ideal np pulses from the memory 38 for output shaft rotating speed detection. When the calculated ideal number of pulses can be expressed as np=A+B (where A is a natural number greater than or equal to 2, and 0<B<1), in other words, when the ideal number of pulses (the average number of pulses) np falls between A and (A+1), the output shaft rotating speed detector 36 obtains the time lengths of pulse interval in A pulses and those in (A+1) pulses. Further, in step S204, the output shaft rotating speed detector 36 calculates the rotation speed Nout1 of the output shaft 14-2 using the time lengths of pulse intervals in the A pulse signals and calculates the rotation speed Nout2 of the output-shaft 14-2 using the time lengths of pulse intervals in the (A+1) pulse signals. Next, in step S205, the output shaft rotating speed detector 36 calculates the rotation speed Nout of the output shaft 14-2 at the time tn using Equation 1 as follows.

$$Nout=Nout1\times(1-B)+Nout2\times B \qquad \text{[Equation 1]}$$

Further, in step S206, the output shaft rotating speed detector 36 performs synchronization with a routine for calculating a motor rotating speed. For example, when a time lag between calculation timings of the rotation speed Nin of the motor 10 and the rotation speed Nout of the output shaft 14-2 occurs due to delay of communication between the motor controller 20 and the automatic transmission controller 22 or the like, the calculation timings are synchronized with respect to a delayed one of the calculation timings. Next, in step S207, the output shaft rotating speed detector 36 performs low-pass filtering (smoothing) of the calculated rotation speed Nout of the output shaft 14-2. Noise components contained in the calculated rotation speed Nin of the motor 10 are suppressed through the low-pass filtering (smoothing). Then, operation of this routine is finished.

On the other hand, once the routine for calculating an output shaft rotating speed shown in FIG. 8 starts, the output shaft rotating speed detector 36 calculates the number of pulse signals (the ideal number of pulses) np output from the AD converter 34 (the electromagnetic pickup sensor 16) during the predetermined angle δα1 (for example, 180°) of rotation of the rotor for the motor 10 (the input shaft 14-1 of the automatic transmission 14) in step S301. Here, the ideal number of pulses (the average number of pulses) np may be estimated using Equation 2 as follows.

$$np=Z/\gamma\times\delta\alpha 1/360 \qquad \text{[Equation 2]}$$

Where Z is the total number of teeth on the tooth-shaped rotor, and γ is the transmission gear ratio of the automatic transmission 14 which can be calculated from a ratio Nin/Nout of the rotation speed Nin of the motor 10 to the rotation speed Nout of the output shaft 14-2 detected at the past point in time prior to the time tn, for example, detected in the previous detection (last detection).

Process steps from S302 to S307 in the routine for calculating an output shaft rotating speed of FIG. 8 are similar to those from S202 to S207 in the routine for calculating an output shaft rotating speed of FIG. 7, and descriptions of the steps are not repeated.

In the above-described embodiment, when the rotation speed Nin of the motor 10 (the rotation speed Nin of the input shaft 14-1) is determined based on a change of the output signals from the resolver 12 in the predetermined time period δt1 (i.e. when the constant-time detection is performed), the number of pulse signals output from the electromagnetic pickup sensor 16 within the predetermined time period δt1 is calculated, and the rotation speed Nout of the output shaft 14-2 is obtained based on the time lengths of pulse intervals in the calculated number of pulse signals. Accordingly, the number of pulse signals from the electromagnetic pickup sensor 16 to be used for calculating the rotation speed Nout of the output shaft 14-2 may be changed, to synchronize (match) a detection period of the output signals from the resolver 12 to be used for calculating the rotation speed Nin of the motor 10 with a detection period of the pulse signals from the electromagnetic pickup sensor 16 to be used for calculating the rotation speed Nout of the output shaft 14-2. As a result, the response delays in the obtained rotation speed Nin of the motor 10 and rotation speed Nout of the output shaft 14-2 can be matched, which can provide consistent accuracy in detecting the rotation speed Nin of the motor 10 and the rotation speed Nout of the output shaft 14-2. In particular, when there exist greater time-varying changes in the rotation speed Nin of the input shaft 14-1 and rotation speed Nout of the output shaft 14-2, the detection period of sensor signals used for calculating the rotation speed Nin of the input shaft 14-1 differs from the detection period of pulse signals used for calculating the rotation speed Nout of the output shaft 14-2, leading to an increased possibility of occurrence of a difference in detection accuracy between the rotation speeds of the input shaft 14-1 and the output shaft 14-2. According to the present embodiment, however, the accuracy in detecting the rotation speed Nin of the input shaft 14-1 and that in detecting the rotation speed Nout of the output shaft 14-2 can be consistent even though time-varying changes of the rotation speeds Nin and Nout of the input and output shafts 14-1 and 14-2 are great. Consequently, according to the present embodiment, it becomes possible to improve accuracy of the automatic transmission 14 in clutch-to-clutch speed change control performed based on the rotation speed Nin of the motor 10 and the rotation speed Nout of the output shaft 14-2, which can yield an effect that gear shift shock occurring during the switching of the frictional engagement device to be engaged is suppressed.

On the other hand, when the time required for the predetermined angle $\delta\alpha1$ of rotation of the rotor (the input shaft 14-1) in the motor 10 is determined based on the output signal from the resolver 12 to detect the rotation speed Nin of the motor 10 (i.e. when the constant-angle detection is performed), the number of pulse signals output from the electromagnetic pickup sensor 16 during the predetermined angle $\delta\alpha1$ of rotation of the rotor in the motor 10 is calculated, and the rotation speed Nout of the output shaft 14-2 is determined based on the time lengths of pulse intervals in the calculated number of pulse signals. Also, in this detection, the number of pulse signals from the electromagnetic pickup sensor 16 to be used for calculating the rotation speed Nout of the output shaft 14-2 can be changed, to thereby synchronize (match) the detection period of the output signals from the resolver 12 used for calculating the rotation speed Nin of the motor 10 with the detection period of the pulse signals from the electromagnetic pickup sensor 16 used for calculating the rotation speed Nout of the output shaft 14-2. It is therefore possible to maintain consistent accuracy in detecting the rotation speed Nin of the motor 10 and detecting the rotation speed Nout of the output shaft 14-2.

Further, according to the present embodiment, when the calculation result of the rotation speed Nin of the motor 10 in the constant-angle detection is greater than the predetermined rotation speed N1, it is selected that the constant-angle detection is performed to detect the rotation speed Nin of the motor 10, which can secure improved accuracy in detecting the rotation speed Nin of the motor 10 during high-speed rotation. When the calculation result of the rotation speed Nin of the motor 10 in the constant-angle detection is smaller than or equal to the predetermined rotation speed N1, it is selected that the constant-time detection is performed to detect the rotation speed Nin of the motor 10, which can secure improved accuracy in detecting the rotation speed Nin of the motor 10 during low-speed rotation. As described above, detection accuracy of the rotation speed Nin of the motor 10 can be improved according to the present embodiment by selecting, based on the calculation result of the rotation speed Nin of the motor 10, either one of the constant-time detection and constant-angle detection performed for determining the rotation speed Nin of the motor 10.

Next, a modification example of the configuration according to the present embodiment will be described.

Figure 9:
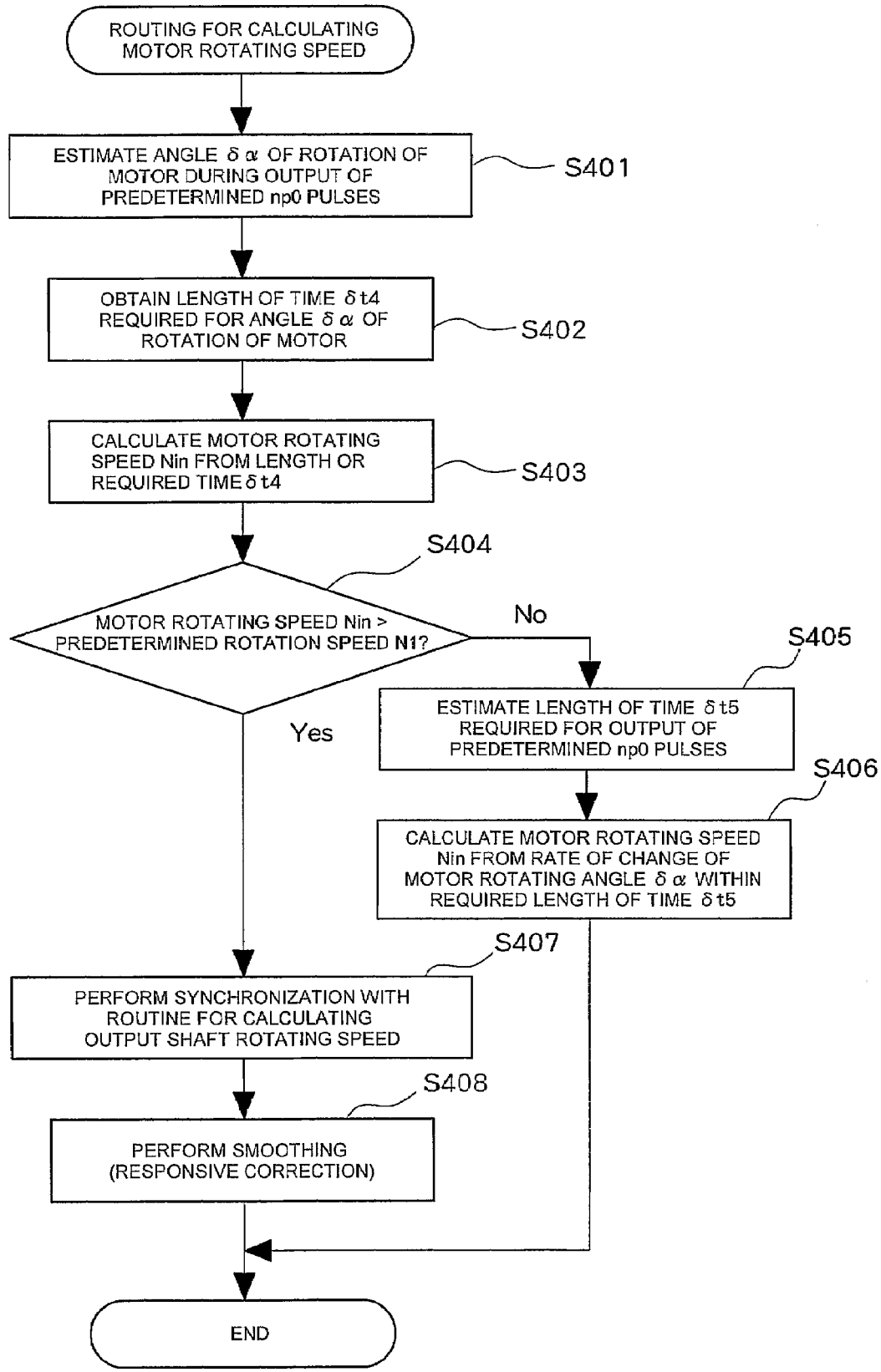
FIG. 9 is a flowchart showing another example of a routine for calculating a motor rotating speed executed by the motor controller.

In the above-described routine for calculating an output shaft rotating speed, the number of pulse signals from the electromagnetic pickup sensor 16 used for calculating the rotation speed Nout of the output shaft 14-2 is changed. In the routine for calculating an output shaft rotating speed of this example, however, the output shaft rotating speed detector 36 is also capable of detecting the rotation speed Nout of the output shaft 14-2 based on the time lengths of pulse interval in a predetermined number np0 of pulse signals output from the AD converter 34 (the electromagnetic pickup sensor 16). Process steps of determining the rotation speed Nin of the motor 10 at the time tn in this modification example will be described below. FIG. 9 is a flowchart showing another routine for calculating the motor rotating speed executed by the motor controller 20. This routine is repeatedly executed at intervals of predetermined control cycles.

Once the routine for calculating the motor rotating speed of FIG. 9 is initiated, the input shaft rotating speed detector 26 calculates a rotation angle $\delta\alpha$ of the rotor of the motor 10 (the input shaft 14-1 of the automatic transmission 14) while the predetermined np0 pulse signals are being output from the AD converter 34 (the electromagnetic pickup sensor 16). Here, the rotation angle $\delta\alpha$ of the rotor of the motor 10 may be estimated by Equation 3 described below. In Equation 3, the transmission gear ratio $\gamma$ of the automatic transmission 14 can be calculated from the ratio Nin/Nout of the rotation speed Nin of the motor 10 and the rotation speed Nout of the output shaft 14-2 detected at a past point in time prior to the time tn, for example, the rotation speeds Nin, Nout detected in the previous detection (last detection).

$$\delta\alpha = np0 \times \gamma \times 360/Z \qquad \text{[Equation 3]}$$

In subsequent step S402, the input shaft rotating speed detector 26 obtains the length of time $\delta t4$ required for the rotor of the motor 10 to rotate by the angle $\delta\alpha$ calculated in step S401. The length of required time $\delta t4$ may be detected from the output signals from the RD converter 24. Next, in step S403, the input shaft rotating speed detector 26 calculates the rotation speed Nin of the motor 10 from the length of required time $\delta t4$ obtained in step S402.

Then, in step S404, the input shaft rotating speed detector 26 judges whether or not the rotation speed Nin of the motor 10 calculated in step S403 is greater than the predetermined rotation speed N1. When the rotation speed Nin of the motor 10 is smaller than or equal to the predetermined rotation speed N1 (when NO is judged in step S404), it is determined that calculation accuracy of the rotation speed Nin of the motor 10 in step S403 will be lowered, and operation moves to step S405. On the other hand, when the rotation speed Nin of the motor 10 is greater than the predetermined rotation speed N1 (when YES is judged in step S404), it is determined that the calculation accuracy of the rotation speed Nin of the motor 10 in step S403 can be secured, and operation moves to step S406.

In step S405, the input shaft rotating speed detector 26 calculates the length of time $\delta t5$ required for the output of the predetermined np0 pulse signals from the AD converter 34 (electromagnetic pickup sensor 16). Here, the length of required time δt5 may be estimated from the rotation speed Nout of the output shaft 14-2 detected at a past point in time prior to the time tn, for example, that detected in the previous detection (last detection). Alternatively, the length of required time δt5 may be estimated from the rotation speed Nin of the motor 10 detected at a past point in time prior to the time tn, for example, that detected in the previous detection (last detection). Next, in step S406, the input shaft rotating speed detector 26 obtains the rate of time-varying change of the rotation angle α of the motor 10 within the calculated length of required time δt5, to calculate the rotation speed Nin of the motor 10. The rate of change of the rotation angle α of the motor 10 with respect to time may be obtained from the output signals of the RD converter 24. Then, operation of this routine is finished.

Process steps S407 and S408 in the routine for calculating the motor rotating speed of FIG. 9 are similar to process steps S105 and S106 in the routine for calculating the motor rotating speed of FIG. 6, respectively, and description of the steps is not repeated.

In the above-described configuration according to the present embodiment, the length of time δt5 required for output of the predetermined np0 pulse signals from the electromagnetic pickup sensor 16 is calculated, and the rotation speed Nin of the motor 10 is calculated based on changes of the output signals from the resolver 12 within the calculated length of required time δt5. As a result, because the detection period of the output signals from the resolver 12 used for calculating the rotation speed Nin of the motor 10 can be matched with that of the pulse signals from the electromagnetic pickup sensor 16 used for calculating the rotation speed Nout of the output shaft 14-2, consistent accuracy can be maintained between detections of the rotation speed Nin of the motor 10 and the rotation speed Nout of the output shaft 14-2.

The angle δα by which the rotor of the motor 10 rotates while the predetermined np0 pulse signals are being output from the electromagnetic pickup sensor 16 is calculated, and the length of time δt4 required for the rotor of the motor 10 to rotate by the calculated angle δα is determined based on the output signals from the resolver 12 to detect the rotation speed Nin of the motor 10. Also with this configuration, the detection period of the output signals from the resolver 12 used for calculating the rotation speed Nin of the motor 10 can be matched with that of the pulse signals from the electromagnetic pickup sensor 16 used for calculating the rotation speed Nout of the output shaft 14-2, thereby making it possible to maintain consistent accuracy between detections of the rotation speed Nin of the motor 10 and the rotation speed Nout of the output shaft 14-2.

Although, in the above-described embodiment, the rotation speed Nin of the input shaft 14-1 is detected by the resolver 12 and the rotation speed Nout of the output shaft 14-2 is detected by the electromagnetic pickup sensor 16 in the automatic transmission 14, the rotation speed Nin of input shaft 14-1 may be detected by the electromagnetic pickup sensor, and the rotation speed Nout of output shaft 14-2 may be detected by the resolver depending on the overall configuration of the system.

Further, in the present embodiment, the rotation speed Nout of the output shaft 14-2 may be determined using an output-shaft-side electromagnetic pickup sensor in which a pulse signal is output for each predetermined angle δθ1 of rotation of the output shaft 14-2, while the rotation speed Nin of input shaft 14-1 may be determined using an input-shaft-side electromagnetic pickup sensor in which a pulse signal is output for each predetermined angle δθ2 of rotation of the input shaft 14-1.

In this case, the input shaft rotating speed detector 26 detects the rotation speed Nin of the input shaft 14-1 based on the time lengths of pulse interval in the predetermined np0 pulse signals output from the input-shaft-side electromagnetic pickup sensor. The output shaft rotating speed detector 36, on the other hand, detects the rotation speed Nout of the output shaft 14-2 based on the time lengths of pulse intervals in a plurality of pulse signals output from the output-shaft-side electromagnetic pickup sensor. Further, the output shaft rotating speed detector 36 estimates the number of pulse signals (the ideal number of pulses) np which will be output from the electromagnetic pickup sensor on the output shaft side during the output of the predetermined np0 pulse signals from the electromagnetic pickup sensor on the input shaft side, and detects the rotation speed Nout of the output shaft 14-2 based on the time lengths of pulse intervals in the estimated ideal np pulses. Also with this configuration, because the detection period of the pulse signals used for calculating the rotation speed Nin of the input shaft 14-1 can be matched with that of the pulse signals used for calculating the rotation speed Nout of the output shaft 14-2, consistent accuracy can be maintained between detections of the rotation speed Nin of the input shaft 14-1 and the rotation speed Nout of the output shaft 14-2. It should be noted that the ideal number of pulses np may be calculated from the ratio Nin/Nout of the rotation speed Nin of the input shaft 14-1 to the rotation speed Nout of the output shaft 14-2 found in a previous detection (for example, the last detection).

Further, the output shaft rotating speed detector 36 is also capable of detecting the rotation speed Nout of the output shaft 14-2 based on the time lengths of pulse intervals in the predetermined np0 pulse signals output from the electromagnetic pickup sensor on the output shaft side. In this case, the input shaft rotating speed detector 26 estimates the number of pulse signals (the ideal number of pulses) np output from the electromagnetic pickup sensor on the input shaft side during the output of the predetermined np0 pulse signals from the electromagnetic pickup sensor on the output shaft side, and detects the rotation speed Nin of the input shaft 14-1 based on the time lengths of pulse intervals in the estimated ideal np pulses.

Figure 10:
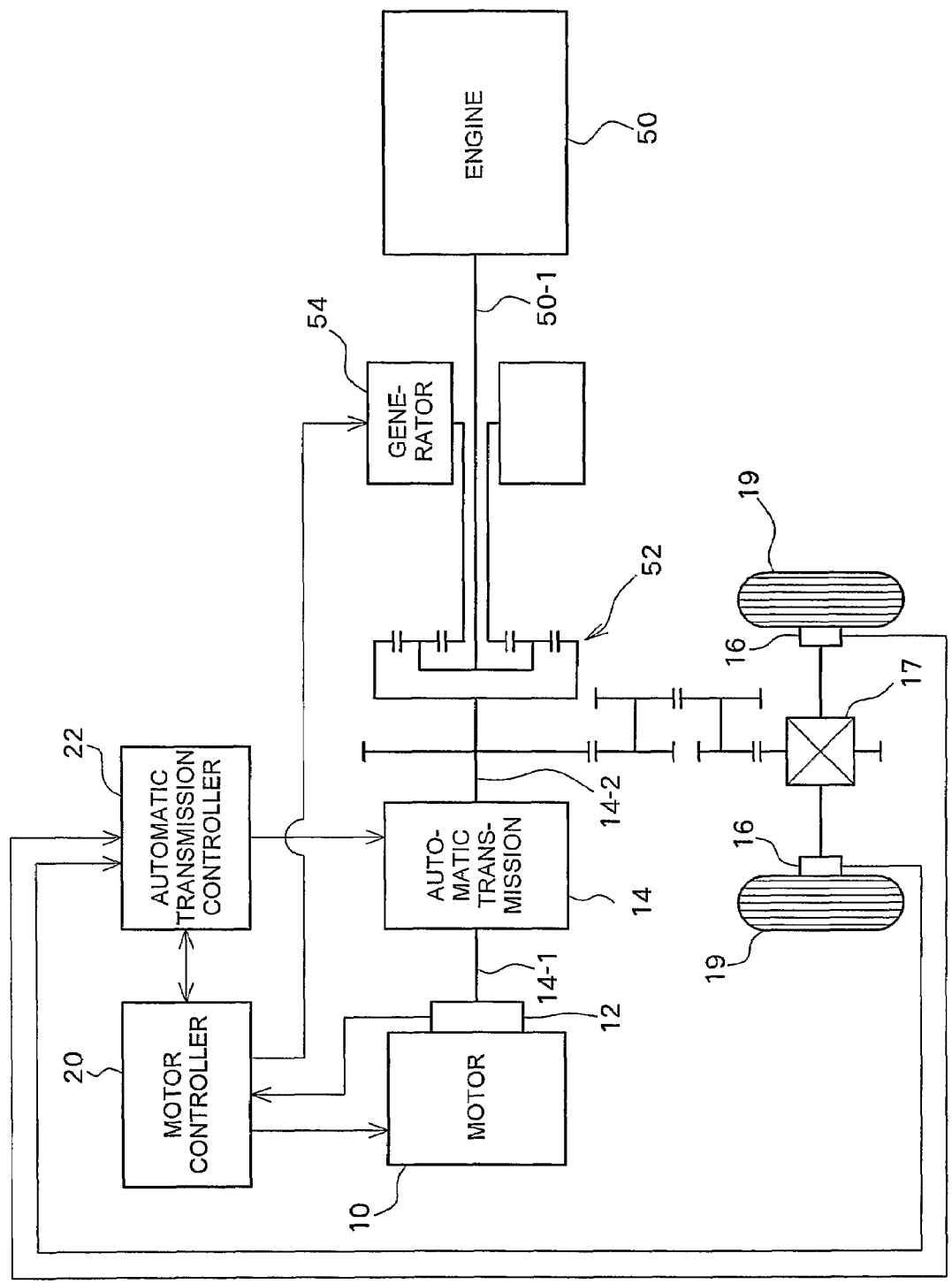
FIG. 10 shows a schematic configuration of a driving system in a hybrid vehicle having the rotation speed detecting apparatus according to the embodiment of the present invention.

Next, another application example of the rotation speed detecting apparatus according to the present embodiment will be described. FIG. 10 shows a schematic configuration of a driving system in a hybrid vehicle having the rotation speed detecting apparatus according to the present embodiment of this invention.

The rotor of the motor 10 is connected to the input shaft 14-1 of the automatic transmission 14 which performs a speed change of drive power transferred from the motor 10 to the input shaft 14-1 and transfers the speed-changed drive power to the output shaft 14-2. The drive power transferred to the output shaft 14-2 of the automatic transmission 14 is further transferred via a differential gear 17 to drive wheels 19 for use in driving a load, such as a vehicle.

An output shaft 50-1 of an engine 50 is coupled to a power transfer mechanism 52. In addition to the output shaft 50-1 of the engine 50, the power transfer mechanism 52 is connected to the output shaft 14-2 of the automatic transmission 14 (the drive wheels 19) and a rotor of a generator 54 to distribute the drive power from the engine 50 among the drive wheels 19 and the generator 54. Here, the power transfer mechanism 52 may be configured, for example, with a planetary gear mechanism having a ring gear, a carrier, and a sun gear. Operation conditions of the motor 10 and the generator 54 are controlled by the motor controller 20.

To detect the rotation speed Nin of the rotor of the motor 10 (the rotation speed Nin of the input shaft 14-1 of the automatic transmission 14), the resolver 12 is provided to the motor 10. Further, to detect the rotation speed Nout of the drive wheels 19 (the rotation speed Nout of the output shaft 14-2 of the automatic transmission 14), the electromagnetic pickup sensor 16 is provided to the drive wheels 19. Other components are similar to those depicted in FIGS. 1 and 2, and description of the similar components is not repeated.

In the above-described embodiment, although the motor controller 20 and the automatic transmission controller 22 are configured as individual separate controllers, the two controllers may be integrally configured.

Although the invention has been described in its preferred form with a certain degree of particularity, it is to be understood that the invention is not limited to the specific embodiments but may be otherwise variously embodied within the scope of the following claims.

The invention claimed is:

1. A rotation speed detecting apparatus for detecting rotation speeds of a first rotating member and a second rotating member using a first sensor which outputs a pulse signal for each predetermined angle of rotation of the first rotating member and a second sensor which outputs a signal corresponding to an angle of rotation of the second rotating member, comprising:
    a first rotation speed detector which detects the rotation speed of the first rotating member based on a time length of pulse intervals in a plurality of pulse signals output from the first sensor, and
    a second rotation speed detector which detects the rotation speed of the second rotating member based on the output signal from the second sensor, wherein
    a detection period of the pulse signal from the first sensor used for determining the rotation speed of the first rotating member is synchronized with a detection period of the output signal from the second sensor used for determining the rotation speed of the second rotating member to detect the rotation speeds of the first and second rotating members.

2. A rotation speed detecting apparatus according to claim 1, wherein
    the first sensor is an electromagnetic pickup sensor while the second sensor is a resolver.

3. An automatic transmission controller for performing, on an automatic transmission capable of switching a frictional engagement device to be engaged among a plurality of frictional engagement devices to change a transmission gear ratio between input and output shafts, speed change control of disengaging an engaged one of the frictional engagement devices while engaging a released one of the frictional engagement devices which has not been engaged, the automatic transmission controller comprising:
    a rotation speed detecting apparatus according to claim 1, wherein
    a rotation speed of one of the input and output shafts is detected as the rotation speed of the first rotating member while a rotation speed of the other one of the input and output shafts is detected as the rotation speed of the second rotating member, and
    the speed change control is performed based on the rotation speeds of the input and output shafts detected using the rotation speed detecting apparatus.

4. A rotation speed detecting apparatus for detecting rotation speeds of a first rotating member and a second rotating member using a first sensor which outputs a pulse signal for each predetermined angle of rotation of the first rotating member and a second sensor which outputs a signal corresponding to an angle of rotation of the second rotating member, comprising:
    a first rotation speed detector which detects the rotation speed of the first rotating member based on a time length of pulse intervals in a plurality of pulse signals output from the first sensor; and
    a second rotation speed detector which detects the rotation speed of the second rotating member based on a change of the output signal from the second sensor within a predetermined time period, wherein
    the first rotation speed detector calculates the number of pulse signals output from the first sensor within the predetermined time period, to detect the rotation speed of the first rotating member based on the time length of pulse intervals in the calculated number of pulse signals.

5. A rotation speed detecting apparatus according to claim 4, wherein
    the first rotation speed detector calculates the number of pulse signals based on a previously detected rotation speed of the first rotating member.

6. A rotation speed detecting apparatus according to claim 4, wherein
    the first rotation speed detector detects the rotation speed of the first rotating member based on the time lengths of pulse intervals in n pulse signals and in (n+1) pulse signals where n is a natural number greater than or equal to 2 when the calculated number of pulse signals falls between n and n+1.

7. A rotation speed detecting apparatus according to claim 4, wherein
    the first sensor is an electromagnetic pickup sensor while the second sensor is a resolver.

8. A rotation speed detecting apparatus for detecting rotation speeds of a first rotating member and a second rotating member using a first sensor which outputs a pulse signal for each first predetermined angle of rotation of the first rotating member and a second sensor which outputs a signal corresponding to an angle of rotation of the second rotating member, comprising:
    a first rotation speed detector which detects the rotation speed of the first rotating member based on a time length of pulse intervals in a plurality of pulse signals output from the first sensor, and
    a second rotation speed detector which detects a length of time required for a second predetermined angle of rotation of the second rotating member based on the output signal from the second sensor to detect the rotation speed of the second rotating member, wherein
    the first rotation speed detector calculates the number of pulse signals output from the first sensor during the second predetermined angle of rotation of the second rotating member, and detects the rotation speed of the first rotating member based on a time length of pulse intervals in the calculated number of pulse signals.

9. A rotation speed detecting apparatus according to claim 8, wherein
    the first rotation speed detector calculates the number of pulse signals based on previously detected rotation speeds of the first rotating member and the second rotating member.

10. A rotation speed detecting apparatus according to claim 8, wherein the first rotation speed detector detects the rotation speed of the first rotating member based on the time lengths of pulse intervals in n pulse signals and in (n+1) pulse signals where n is a natural number greater than or equal to 2 when the calculated number of pulse signals falls between n and n+1.

11. A rotation speed detecting apparatus according to claim 10, wherein
the first sensor is an electromagnetic pickup sensor while the second sensor is a resolver.

12. A rotation speed detecting apparatus according to claim 8, wherein
the first sensor is an electromagnetic pickup sensor while the second sensor is a resolver.

13. A rotation speed detecting apparatus for detecting rotation speeds of a first rotating member and a second rotating member using a first sensor which outputs a pulse signal for each first predetermined angle of rotation of the first rotating member and a second sensor which outputs a signal corresponding to an angle of rotation of the second rotating member, comprising:
a first rotation speed detector which detects the rotation speed of the first rotating member based on a time length of pulse intervals in a plurality of pulse signals output from the first sensor; and
a second rotation speed detector capable of selectively performing constant-time detection in which the rotation speed of the second rotating member is determined based on a change of the output signal from the second sensor within a predetermined time period, and constant-angle detection in which a length of time required for a second predetermined angle of rotation of the second rotating member is determined based on the output signal from the second sensor, to detect the rotation speed of the second rotating member, wherein
when the second rotation speed detector performs the constant-time detection to detect the rotation speed of the second rotating member, the first rotation speed detector calculates the number of pulse signals output from the first sensor within the predetermined time period, to detect the rotation speed of the first rotating member based on a time length of pulse intervals in the calculated number of pulse signals, and
when the second rotation speed detector performs the constant-angle detection to detect the rotation speed of the second rotating member, the first rotation speed detector calculates the number of pulse signals output from the first sensor during the second predetermined angle of rotation of the second rotating member, to detect the rotation speed of the first rotating member based on a time length of pulse intervals in the calculated number of pulse signals.

14. A rotation speed detecting apparatus according to claim 13, wherein
the second rotation speed detector selects, based on a detection result of the rotation speed of the second rotating member, one of the constant-time detection and the constant-angle detection to be used for detecting the rotation speed of the second rotating member.

15. A rotation speed detecting apparatus according to claim 14, wherein
the second rotation speed detector selects use of the constant-angle detection in detecting the rotation speed of the second rotating member when the detection result of the rotation speed of the second rotating member is greater than a predetermined rotation speed, and selects use of the constant-time detection in detecting the rotation speed of the second rotating member when the detection result of the rotation speed of the second rotating member is smaller than or equal to the predetermined rotation speed.

16. A rotation speed detecting apparatus according to claim 13, wherein
the first rotation speed detector detects the rotation speed of the first rotating member based on the time lengths of pulse intervals in n pulse signals and in (n+1) pulse signals where n is a natural number greater than or equal to 2 when the calculated number of pulse signals falls between n and n+1.

17. A rotation speed detecting apparatus according to claim 13, wherein
the first sensor is an electromagnetic pickup sensor while the second sensor is a resolver.

18. A rotation speed detecting apparatus for detecting rotation speeds of a first rotating member and a second rotating member using a first sensor which outputs a pulse signal for each predetermined angle of rotation of the first rotating member and a second sensor which outputs a signal corresponding to an angle of rotation of the second rotating member, comprising:
a first rotation speed detector which detects the rotation speed of the first rotating member based on a time length of pulse intervals in a predetermined number of pulse signals output from the first sensor, and
a second rotation speed detector which calculates a length of time required for output of the predetermined number of pulse signals from the first sensor, to detect the rotation speed of the second rotating member based on a change of the output signal from the second sensor within the calculated length of required time.

19. A rotation speed detecting apparatus according to claim 18, wherein
the second rotation speed detector calculates the length of time required based on a previously detected rotation speed of the first rotating member.

20. A rotation speed detecting apparatus for detecting rotation speeds of a first rotating member and a second rotating member using a first sensor which outputs a pulse signal for each predetermined angle of rotation of the first rotating member and a second sensor which outputs a signal corresponding to an angle of rotation of the second rotating member, comprising:
a first rotation speed detector which detects the rotation speed of the first rotating member based on a time length of pulse intervals in a predetermined number of pulse signals output from the first sensor; and
a second rotation speed detector which calculates an angle of rotation of the second rotating member during output of the predetermined number of pulse signals from the first sensor and determines a length of time required for the calculated angle of rotation of the second rotating member based on the output signal from the second sensor, to detect the rotation speed of the second rotating member.

21. A rotation speed detecting apparatus according to claim 20, wherein
the second rotation speed detector calculates the angle of rotation of the second rotating member based on previously detected rotation speeds of the first and second rotating members.

22. A rotation speed detecting apparatus for detecting rotation speeds of a first rotating member and a second rotating member using a first sensor which outputs a pulse signal for each first predetermined angle of rotation of the first rotating member and a second sensor which outputs a pulse signal for each second predetermined angle of rotation of the second rotating member, comprising:

a first rotation speed detector which detects the rotation speed of the first rotating member based on a time length of pulse intervals in a predetermined number of pulse signals output from the first sensor; and a second rotation speed detector which detects the rotation speed of the second rotating member based on a time length of pulse intervals in a plurality of pulse signals output from the second sensor, wherein the second rotation speed detector calculates the number of pulse signals output from the second sensor during output of the predetermined number of pulse signals from the first sensor, to detect the rotation speed of the second rotating member based on a time length of pulse intervals in the calculated number of pulse signals.

* * * * *